(12) United States Patent
Hayashi (10) Patent No.: US 10,183,720 B2
(45) Date of Patent: Jan. 22, 2019

(54) ENGINE SUPPORT STRUCTURE FOR SADDLED VEHICLE

(71) Applicant: KAWASAKI JUKOGYO KABUSHIKI KAISHA, Hyogo (JP)

(72) Inventor: Shiken Hayashi, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 24 days.

(21) Appl. No.: 15/512,621

(22) PCT Filed: Aug. 24, 2015

(86) PCT No.: PCT/JP2015/073727
§ 371 (c)(1),
(2) Date: Mar. 20, 2017

(87) PCT Pub. No.: WO2016/047341
PCT Pub. Date: Mar. 31, 2016

(65) Prior Publication Data
US 2017/0320533 A1    Nov. 9, 2017

(30) Foreign Application Priority Data

Sep. 24, 2014  (JP) ................................ 2014-194196

(51) Int. Cl.
*B62K 11/12* (2006.01)
*F16F 15/08* (2006.01)
(Continued)

(52) U.S. Cl.
CPC .............. *B62K 11/12* (2013.01); *B62K 11/04* (2013.01); *B62K 11/14* (2013.01); *B62K 19/30* (2013.01);
(Continued)

(58) Field of Classification Search
CPC ......... B62K 11/12; B62K 11/04; B62K 11/14; B62K 21/14; B62K 21/20; B62M 7/06; B62M 7/04; F16F 15/1205
See application file for complete search history.

(56) References Cited

U.S. PATENT DOCUMENTS

2005/0254888 A1   11/2005 Oji
2011/0120257 A1   5/2011  Hayashi et al.
(Continued)

FOREIGN PATENT DOCUMENTS

JP    61-48467    * 10/1986
JP    3-28340       3/1991
(Continued)

OTHER PUBLICATIONS

International Search Report dated Oct. 6, 2015 in International (PCT) Application No. PCT/JP2015/073727.
(Continued)

*Primary Examiner* — Tony H Winner
*Assistant Examiner* — Marlon A Arce
(74) *Attorney, Agent, or Firm* — Wenderoth, Lind & Ponack, L.L.P.

(57) ABSTRACT

An engine support structure for a saddled vehicle inhibits transmission of engine vibration to a vehicle body frame and keeps rigidity of the vehicle body frame. The engine support structure for a saddled vehicle includes a pair of mounted portions (21) provided integrally with an engine (E) and disposed at lateral ends in a vehicle width direction of the engine (E), a pair of engine supporting brackets (27) disposed at lateral ends in the vehicle width direction of a vehicle body frame (1) and extending to the mounted portions (21), respectively, and engine mounting portions (31) provided at the brackets (27), respectively, in which each of the mounted portions (21) is mounted to a corre- (Continued)

sponding one of the engine mounting portions (31) with at least one damper member (51) provided therebetween to be independently elastically displaceable.

6 Claims, 8 Drawing Sheets (51) Int. Cl.
| | |
|---|---|
| *B62K 11/04* | (2006.01) |
| *B62K 11/14* | (2006.01) |
| *B62K 21/14* | (2006.01) |
| *B62K 21/20* | (2006.01) |
| *B62M 7/06* | (2006.01) |
| *F16F 15/12* | (2006.01) |
| *B62M 7/04* | (2006.01) |
| *B62K 19/30* | (2006.01) |

(52) U.S. Cl.
CPC .............. *B62K 21/14* (2013.01); *B62K 21/20* (2013.01); *B62M 7/04* (2013.01); *B62M 7/06* (2013.01); *F16F 15/08* (2013.01); *F16F 15/1205* (2013.01); *B62K 2201/02* (2013.01)

(56) References Cited

U.S. PATENT DOCUMENTS

| | | | |
|---|---|---|---|
| 2014/0090919 A1 | 4/2014 | Idaka et al. | |
| 2016/0264206 A1* | 9/2016 | Ishii | B62H 1/00 |

FOREIGN PATENT DOCUMENTS

| | | |
|---|---|---|
| JP | 6-127450 | 5/1994 |
| JP | 6-200980 | 7/1994 |
| JP | 2005/315315 | 11/2005 |
| JP | 2009-180330 | 8/2009 |
| JP | 2011-105276 | 6/2011 |
| JP | 2014-69643 | 4/2014 |

OTHER PUBLICATIONS

Extended European Search Report dated May 4, 2018 in European Application No. 15843706.1.

\* cited by examiner

ENGINE SUPPORT STRUCTURE FOR SADDLED VEHICLE

TECHNICAL FIELD

The present invention relates to an engine support structure for a saddled vehicle such as a motorcycle.

BACKGROUND ART

An engine support structure for a motorcycle is achieved by rigidly fixing a mounted portion of the engine to an engine mounting portion of a vehicle body frame, or is achieved as a so-called rubber mount structure by elastically supporting the engine with a damper member. In the structure with the damper member, right and left engine mounting portions of the vehicle body frame are rigidly connected by a through bolt widthwise penetrating the engine and the engine is mounted to the through bolt with the damper member disposed therebetween. Japanese Patent Laid-open Publication No. 2014-69643 and Japanese Patent Laid-open Publication No. JP 06-127450 exemplify conventional support structures.

In the engine support structures mentioned above, the elastic support structure with the through bolt and the damper member inhibits engine vibration from being transmitted to the vehicle body frame. In a case where a first one of the right and left engine mounting portions of the vehicle body frame is displaced by an external load, the displacement is likely to cause displacement of a second one of the engine mounting portions via the through bolt, and the engine itself thus hardly serves as a rigid member of the vehicle body frame.

It is an object of the present invention to provide an engine support structure for a saddled vehicle, which inhibits transmission of engine vibration to handlebars and the like via a vehicle body frame and utilizes the engine itself as a rigid member of the vehicle body frame.

SUMMARY OF THE INVENTION

In order to achieve the object mentioned above, an engine support structure for a saddled vehicle according to the present invention includes: a pair of mounted portions provided integrally with an engine and disposed at lateral ends in a vehicle width direction of the engine; a pair of engine supporting brackets disposed at lateral ends in the vehicle width direction of a vehicle body frame and extending to the mounted portions, respectively; and engine mounting portions provided at the brackets, respectively; in which each of the mounted portions is mounted to a corresponding one of the engine mounting portions with at least one damper member provided therebetween to be independently elastically displaceable.

In this configuration, the engine is elastically supported to prevent transmission of engine vibration to the frame and handlebars.

In addition to inhibiting transmission of engine vibration to the vehicle body frame, the engine mounting portions support the engine to be independently displaceable so as to allow the engine itself to serve as a rigid member of the vehicle body frame and inhibit deformation of the frame by external force. Specifically, in a case where external force is applied to the vehicle body frame and one of the brackets is displaced, a first one of the engine mounting portions displaces the engine. In this case, the engine is heavy and will thus be displaced by an amount smaller than the amount of displacement of the first one of the engine mounting portions. This decreases the amount of displacement of the first one of the engine mounting portions and inhibits deformation of the bracket as well as the vehicle body frame. Furthermore, the engine is displaced by such a smaller amount, and thus transmits a smaller amount of displacement to a second one of the engine mounting portions when the engine receives force from the one of the brackets. Such inhibition in amount of displacement of the vehicle body frame allows the brackets and the engine to serve as frame reinforcement members.

The present invention provides the engine support structure described above, as well as the following features.

(a) A first one of the engine mounting portion and the mounted portion has a first restraining surface restraining shift of a second one in a predetermined first direction, and a second restraining surface restraining shift of the second one in a second direction perpendicular to the first direction, the second one of the engine mounting portion and the mounted portion has a first opposite surface facing the first restraining surface with a gap therebetween in the first direction, and a second opposite surface facing the second restraining surface with a gap therebetween in the second direction, and the damper member has a first damper portion sandwiched between the first restraining surface and the first opposite surface to be elastically deformable in the first direction, and a second damper portion sandwiched between the second restraining surface and the second opposite surface to be elastically deformable in the second direction.

In this configuration, the first restraining surface and the second restraining surface improve frame rigidity in the first direction and the second direction. The restraining surface and the opposite surface are in elastic contact with the damper member, to inhibit transmission of vibration from the engine to the frame. The frame is thus improved in rigidity and inhibited from vibrating.

(b) A first one of the engine mounting portion and the mounted portion has a proximal portion and a bolt member screwed to the proximal portion in a screwed direction, the damper member is disposed between a head of the bolt member and the proximal portion, and has an uneven portion fitted to a second one of the engine mounting portion and the mounted portion in a direction perpendicular to the screwed direction, and in a state where the mounted portion is mounted to the engine mounting portion with the damper member disposed therebetween, the damper member is deformed by compression in the screwed direction between the proximal portion and the head of the bolt member, and is kept deformed by expansion in the direction perpendicular to the screwed direction.

This configuration allows the damper member to be in elastic contact with the bolt member in the screwed direction as well as in the direction perpendicular thereto, for improvement in rigidity.

(c) The damper member has an outer peripheral surface that is not provided with the uneven portion but is tapered, and the second one of the engine mounting portion and the mounted portion fitted to the outer peripheral surface of the damper member has an inner peripheral surface tapered correspondingly to the outer peripheral surface of the damper member.

In the configuration (c), the outer peripheral surface of the damper member receiving force in the first direction as well as force in the second direction is tapered to prevent generation of shearing force at the damper member.

(d) In the engine support structure for the saddled vehicle including the at least one damper member having the uneven portion or the tapered surface, the at least one damper member has a tuboid shape with a minor radial end and a major radial end, and includes a pair of damper members. The minor radial ends of the damper members fastened by the bolt member face each other with a constant gap in the vehicle width direction. In this case, the outer peripheral surfaces of the damper members are preferably tapered to be gradually decreased in diameter from the major radial ends to the minor radial ends.

In this configuration, the gap in the first direction is provided between the damper members to secure elastic expansion and contraction properties and effectively improve vibration absorption.

(e) In the structure including the pair of opposite damper members each having the tapered outer peripheral surface, the major radial end, and the minor radial end, the outer peripheral surfaces of the damper members are tapered to be gradually decreased in diameter from the major radial ends to the minor radial ends.

The pair of damper members is inserted in the first direction to be mounted to the engine mounting portion in this configuration, to facilitate insertion of the damper members.

(f) In the structure including the pair of opposite damper members each having the tapered outer peripheral surface, the major radial end, and the minor radial end, the bolt member includes a shaft having an outer peripheral surface fitted to a collar having a flange and a washer in abutment with an end edge opposite to the flange of the collar, and the damper members are fitted to an outer peripheral surface of the collar, and the flange and the washer are in contact with the end edges in the vehicle width direction of the damper members.

This configuration does not cause relative displacement of the collar and the washer with respect to the proximal portion upon screwing for assembling, and prevents application of axial force to the damper members. The collar and the washer are provided separately from each other and the damper members are inserted along the axis of the bolt, to dispose the damper members around the collar and simplify the configuration of the damper members.

According to a different aspect of the present invention, an engine support structure for a saddled vehicle includes an engine mounting portion provided at a vehicle body frame, and a mounted portion provided at an engine and mounted to the engine mounting portion with a bolt member and a damper mechanism, in which the engine mounting portion has a mount hole penetrating in a vehicle width direction and having a center in the vehicle width direction smaller in diameter than ends in the vehicle width direction, the mounted portion has a female screw hole, the damper mechanism includes a pair of tuboid damper members each having a minor radial end, a major radial end, and a tapered outer peripheral surface, and the damper members are fitted to the mount hole with the minor radial ends facing each other in the vehicle width direction, the bolt member is inserted through the damper members in the vehicle width direction to be screwed to the female screw hole, to restrain shift of the damper members in the vehicle width direction between a head of the bolt member and the mounted portion, and the tapered outer peripheral surfaces of the damper members are in abutment with a tapered inner peripheral surface of the mount hole to allow the damper members to be compressed axially and radially with respect to the bolt member.

The damper members according to this different aspect are larger in volume than a conventional damper made of baked rubber or the like, for effectively improved inhibition of vibration from the engine to the vehicle body frame. Furthermore, this aspect effectively inhibits vibration transmission in the vehicle width direction as well as in the direction perpendicular to the vehicle width direction. Meanwhile, external force applied to the frame can be transmitted to the engine to utilize the engine and the frame as rigid members. The damper members are detachably attached by a mounting bolt and are thus easily replaceable with dampers of different hardness.

Effects of the Invention

In summary, in a mount structure of an engine mounted on a saddled vehicle such as a motorcycle according to the present invention, the engine is elastically supported to prevent transmission of engine vibration to a frame and handlebars as well as inhibit deformation of the frame by external force.

DETAILED DESCRIPTION OF THE INVENTION

Figure 1:
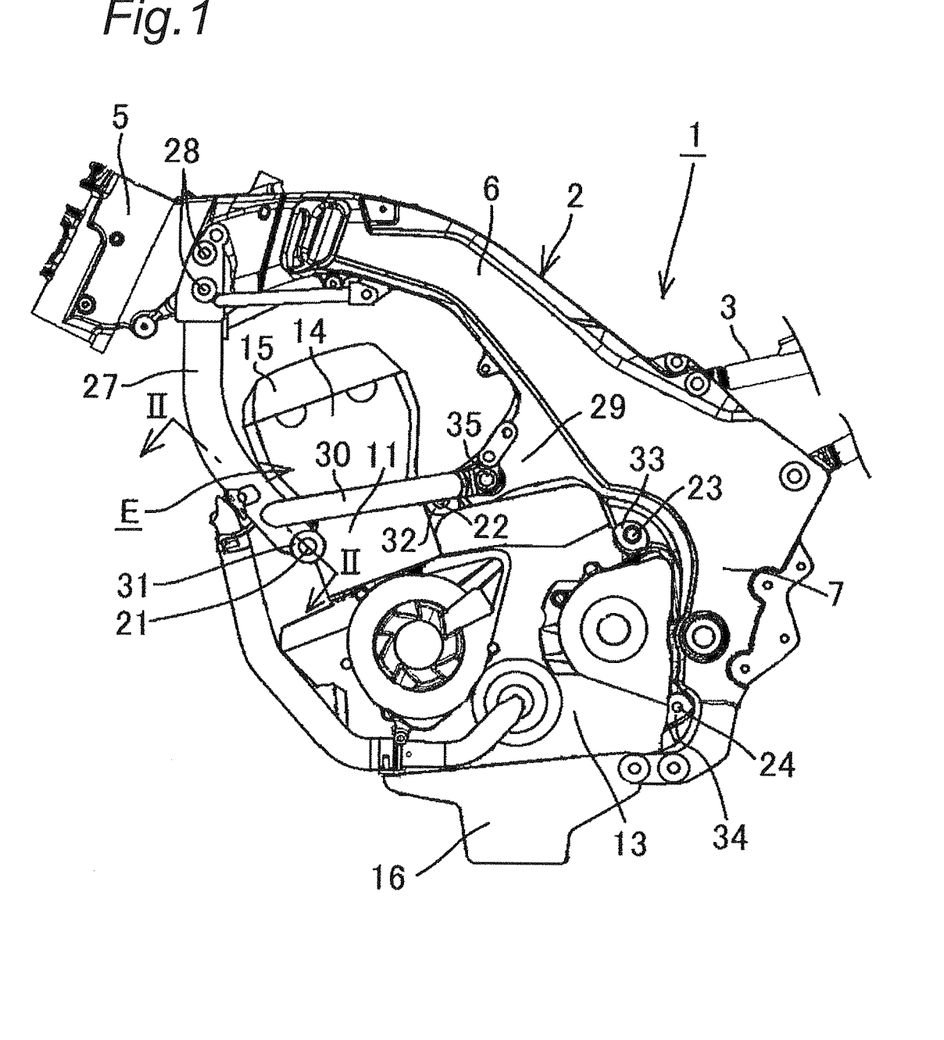
FIG. 1 is a left side view of a vehicle body frame and an engine of a motorcycle according to a first embodiment of the present invention.

FIGS. 1 to 6 each depict an engine support structure for a motorcycle according to a first embodiment of the present invention. The first embodiment will now be described with reference to these figures. In FIG. 1, the motorcycle includes a vehicle body frame 1 having a main frame 2 and a rear frame (partially depicted) 3. The main frame 2 integrally includes a head tube 5, a pair of right and left main frame members 6 extending backward from the head tube 5, and a swing arm bracket 7 extending downward from the rear end of each of the main frame members 6. The head tube 5 rotationally supports a steering axle (not depicted) coupled with a steering bracket, a front fork, and a handle device.

The vehicle includes an engine E disposed ahead of the swing arm brackets 7 and below the main frame members 6. The engine E is an in-line engine having a plurality of cylinders. The engine E includes a cylinder block 11, a crankcase 13 fastened to the bottom of the cylinder block 12, a cylinder head 14 fastened to the top of the cylinder block 11, a head cover 15 fastened to the top of the cylinder head 14, and an oil pan 16 fastened to the bottom of the crankcase 13.

In order to support the engine E to the vehicle body frame 1, the engine E has a pair of right and left first mounted portions 21 provided at the front end of the cylinder block 11, a pair of right and left second mounted portions 22 provided at the rear end of the cylinder block 11, a third mounted portion 23 provided at the rear upper end of the crankcase 13 and penetrating in the vehicle width direction, and a fourth mounted portion 24 provided at the rear lower end of the crankcase 13 and penetrating in the vehicle width direction.

The main frame members 6 of the vehicle body frame 1 have front ends detachably fixing a pair of right and left engine mounting brackets 27 with bolts 28. The engine mounting brackets 27 each extend downward, gently curve backward toward the first mounted portions 21, and are provided, at positions corresponding to the first mounted portions 21, with tuboid first engine mounting portions 31, respectively. The second mounted portions 22 are provided, adjacent to the rear ends of the right and left main frame members 6, with a pair of right and left forward projections 29. The projections 29 have front ends provided with a pair of right and left second engine mounting portions 32, respectively. Correspondingly to the third mounted portion 23 and the fourth mounted portion 24, a third engine mounting portion 33 and a fourth engine mounting portion 34 are provided at the upper and lower ends of the front surfaces of the swing arm brackets 7 and at a cross member (not depicted) coupling the right and left swing arm brackets 7.

The right and left second mounted portions 22 of the engine E are rigidly fixed by bolts to the right and left second engine mounting portions 32 at the vehicle body frame 1. The third and fourth mounted portions 23 and 24 at the rear end of the crankcase 13 receive through bolts or rods penetrating the third and fourth mounted portions 23 and 24 in the vehicle width direction. The through bolts each have an outer periphery surrounded with a baked rubber damper. The through bolts fasten the right and left third and fourth engine mounting portions 33 and 34 inward in the vehicle width direction to fix the rear end of the crankcase 13 to the swing arm brackets 7.

A coupling tube 30 extending backward is firmly welded to a portion adjacent to the lower end of each of the right and left engine mounting brackets 27 having the first engine mounting portion 31. The coupling tubes 30 extend along the right and left lateral ends at the upper end of the cylinder block 11, reach behind the cylinder block 11, and are detachably coupled by bolts 35 to the projections 29.

Figure 2:
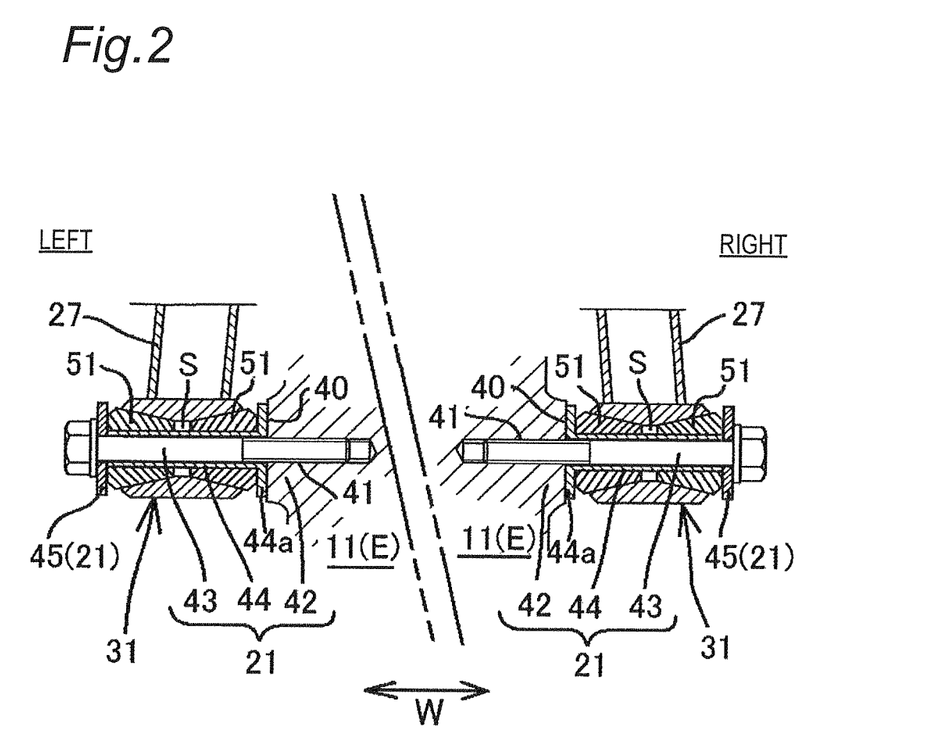
FIG. 2 is an enlarged sectional view taken along line II-II indicated in FIG. 1.

FIG. 2 is an enlarged sectional view taken along line II-II indicated in FIG. 1, depicting structures of the right and left first engine mounting portions 31 and the first mounted portions 21. The right and left first mounted portions 21 each include a proximal portion 42 having a mount surface 40 and a female screw hole 41 provided at each of the right and left end surfaces of the cylinder block 11, a bolt 43 screwed to the female screw hole 41, a flanged collar 44 fitted to the outer periphery of the bolt 43, and a washer 45. The right and left first engine mounting brackets 27 each slightly slant to be displaced outward in the vehicle width direction toward the lower end. The tuboid first engine mounting portion 31 having a mount hole penetrating in the vehicle width direction is firmly welded to the lower end of each of the engine mounting brackets 27. A pair of rubber damper members 51 is disposed each between the first engine mounting portions 31 and the first mounted portions 21.

Figure 3:
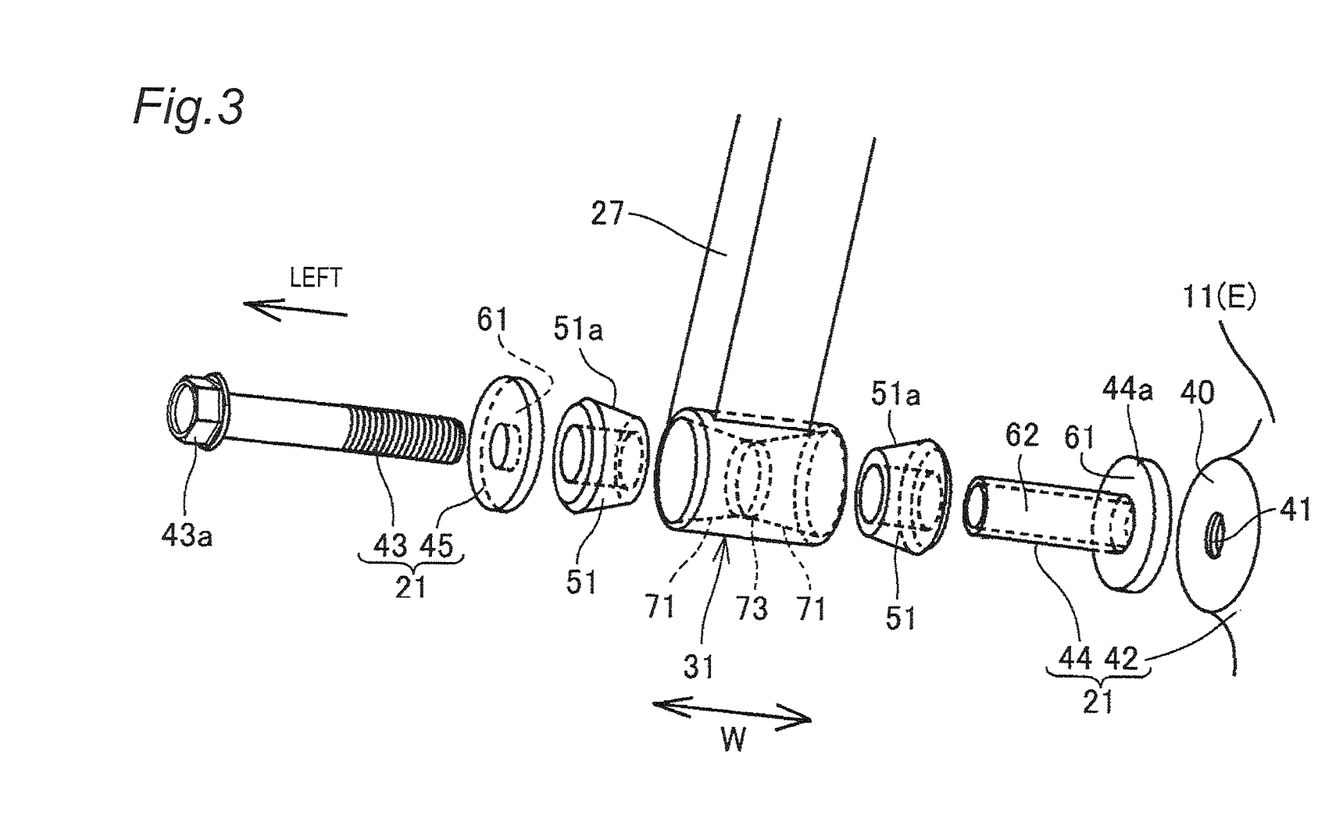
FIG. 3 is an exploded perspective view of an engine mounting portion, a mounted portion, and damper members on the left in FIG. 2.

FIG. 3 is an exploded perspective view of the first engine mounting portion 31 and the first mounted portion 21 on the left of the engine E. The flanged collar 44 of the first mounted portion 21 integrally includes a flange 44a at the inner end (right end) in the vehicle width direction. The flange 44a is in abutment with the mount surface 40 of the first mounted portion 21. The mount hole of the first engine mounting portion 31 is provided with a pair of tapered inner peripheral surfaces 71 gradually decreased in diameter from the respective ends in the vehicle width direction toward the center. The right and left damper members 51 each have a tapered outer peripheral surface 51a corresponding to the tapered inner peripheral surfaces 71 of the first engine mounting portion 31, and a through hole in the vehicle width direction. The washer 45 is disposed on the left of the first engine mounting portion 31 and the left damper member 51. The right and left damper members 51 are fitted to an outer peripheral surface 62 of the collar 44, and the tapered inner peripheral surfaces 71 of the first engine mounting portion 31 are fitted to the tapered outer peripheral surfaces 51a of the right and left damper members 51. The washer 61 and the collar 44 are fitted to the outer peripheral surface of the bolt 43 in the mentioned order from the left and the bolt 43 is screwed in the vehicle width direction to the female screw hole 41 of the proximal portion 42, to mount the first mounted portion 21 of the engine E to the first engine mounting portion 31 of the engine mounting bracket 27 at the vehicle body frame 1.

Figure 4:
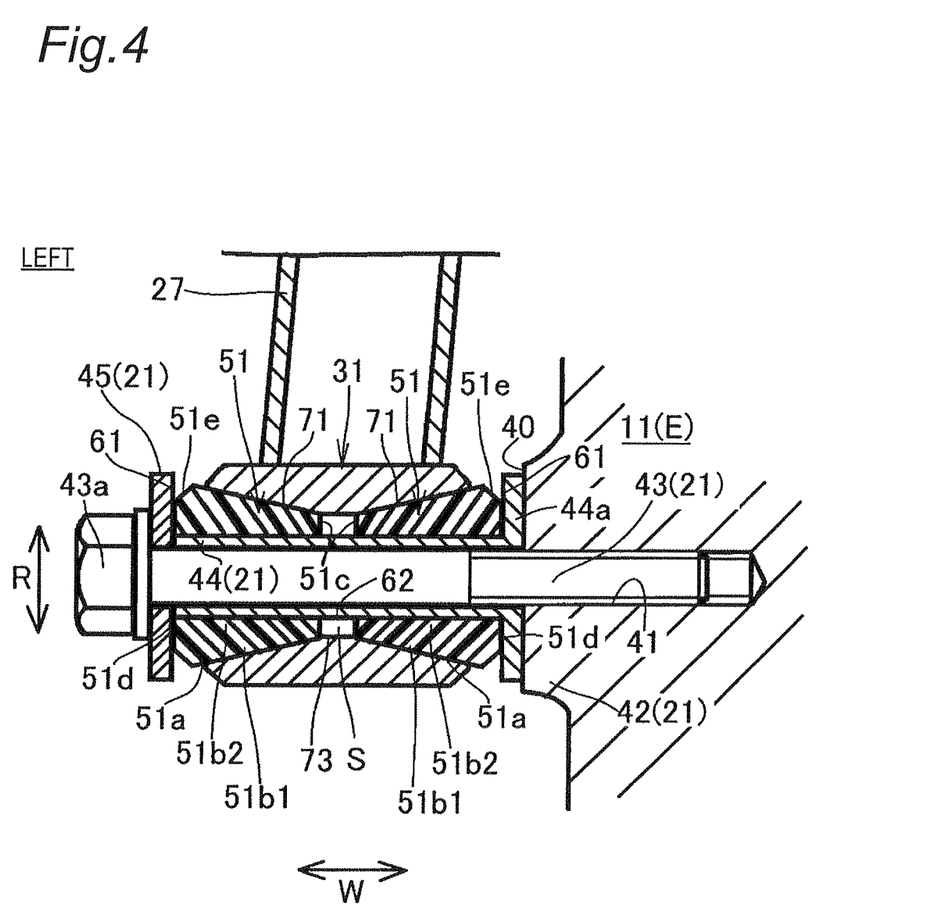
FIG. 4 is a further enlarged sectional view of the engine mounting portion, the mounted portion, and the damper members on the left in FIG. 2.

How the first engine mounting portion 31 and the first mounted portion 21 on the left are assembled to each other will be described in detail with reference to FIG. 4. The present embodiment will assume that the vehicle width direction (from the right to the left) is denoted by a first direction W and the direction perpendicular to the first direction W (specifically, radial direction) is denoted by a second direction R. As to the first mounted portion 21 at the engine E, the flange 44a of the collar 44 is in abutment with the mount surface 40 of the proximal portion 42 as described above, and the washer 45 is in abutment with the left end surface of the collar 44. The left end surface of the flange 44a and the right end surface of the washer 45 serve as first restraining surfaces 61 restraining relative shift in the first direction W between the first mounted portion 21 and the first engine mounting portion 31. Furthermore, the tuboid outer peripheral surface of the collar 44 serves as a second restraining surface 62 restraining relative shift in the second direction R between the first mounted portion 21 and the first engine mounting portion 31.

Meanwhile, as to the first engine mounting portion 31 at the vehicle body frame 1, the right and left tapered inner peripheral surfaces 71 face the first restraining surfaces 61 of the flange 44a and the washer 45 with gaps therebetween in the first direction W, respectively, and face the second restraining surface 62 on the outer periphery of the collar 44 with a gap therebetween in the second direction R. In other words, the right and left tapered inner peripheral surfaces 71 of the first engine mounting portion 31 face the first restraining surfaces 61 and the second restraining surface 62 with the gaps in the first direction W and the second direction R, respectively, to serve as first/second opposite surfaces restraining relative shift in the first direction W and the second direction R between the first mounted portion 21 and the first engine mounting portion 31. Hereinafter, the tapered inner peripheral surfaces of the first engine mounting portion 31 will be called "first/second opposite surfaces 71".

Out of the pair of damper members 51 disposed in the left first engine mounting portion 31, the right (adjacent to the center in the vehicle width direction) damper member 51 has a minor radial end 51c at the left end and a major radial end 51d at the right end to be gradually decreased in diameter toward the left end (the outer end in the vehicle width direction) so as to correspond to the tapered shape of the right first/second opposite surface 71. Meanwhile, the left (adjacent to the outer end in the vehicle width direction) damper member 51 is disposed symmetrically with respect to the right damper member 51, and has the minor radial end 51c at the right end and the major radial end 51d at the left end to be gradually decreased in diameter toward the right end so as to correspond to the tapered shape of the left first/second opposite surface 71. The major radial end 51d of each of the damper members 51 has a chamfered portion 51e.

The damper members 51 each include a first damper portion 51b1 disposed mainly between the first restraining surface 61 and the first/second opposite surface 71 and compressed by force in the first direction W, and a second damper portion 51b2 disposed mainly between the second restraining surface 62 and the first/second opposite surface 71 and receiving force in the second direction R. Each of the damper members 51 has a truncated cone shape and the tapered outer peripheral surface 51a is in abutment with the tapered first/second opposite surface 71 of the first mounted portion 21, so that the first damper portion 51b1 and the second damper portion 51b2 cannot clearly be divided from each other.

In the assembled state, the major radial ends 51d of the right and left damper members 51 disposed in the left first engine mounting portion 31 have end surfaces in pressure contact with the first restraining surfaces 61 of the flange 44a and the washer 45, the tapered outer peripheral surfaces 51a of the right and left damper members 51 are in pressure contact with the first/second opposite inner peripheral surfaces 71, and the minor radial ends 51c of the right and left damper members 51 face each other with a constant gap S in the first direction W. The damper members 51 are thus compressed in the first direction W by constant amounts and expand in the second direction R, and the inner peripheral surfaces of the damper members 51 are in pressure contact with the second restraining surface 62 of the collar 44.

Functional effects of the first embodiment will be described below.

(1) Vibration of the engine E in operation is transmitted from the first to fourth mounted portions 21 to 24 to the vehicle body frame 1 via the first to fourth engine mounting portions 31 to 34. The damper members 51 reduce the engine vibration at the first mounted portion 21. The engine vibration is thus inhibited from transmitting to the handlebars via the engine mounting bracket 27 and the head tube 5.

(2) The engine vibration is inhibited from transmitting to the head tube 5 and the like as described above. Furthermore, the first and second restraining surfaces 61 and 62 and the first/second opposite surfaces 71 restrain relative shift between the first engine mounting portion 31 and the first mounted portion 21 both in the first direction (vehicle width direction) W and the second direction (direction perpendicular to the vehicle width direction) R within a constant range. The engine itself thus serves a rigid member of the vehicle body frame 1 to restrain deformation of the vehicle body frame 1 by external force.

More specifically, if external force is applied to the vehicle body frame 1 to displace the engine mounting bracket 27 during braking, traveling on an uneven surface, or the like, the displacement is transmitted to the engine E via one of the right and left first engine mounting portions 31. In this case, the heavy engine E itself is displaced by a smaller amount than the amount of displacement of the one of the first engine mounting portions 31. This inhibits the amount of displacement of the one of the first engine mounting portions 31 and thus inhibits deformation of the first engine mounting bracket 27 as well as the vehicle body frame 1. Moreover, decrease in amount of displacement of the engine E itself will decrease the amount of displacement transmitted from the engine E having received force from a first one of the right and left engine mounting brackets 27 to a second one of the engine mounting brackets 27. Such inhibition in amount of displacement of the vehicle body frame 1 allows the engine mounting brackets 27 and the engine E to serve as frame reinforcement members.

(3) Each of the first mounted portions 21 of the engine E has the proximal portion 42 and the bolt 43 screwed to the proximal portion 42 in the screwed direction (first direction W). In the state where the first mounted portion 21 is mounted to the first engine mounting portion 31 with the damper members 51 disposed therebetween, the damper members 51 are deformed by compression in the screwed direction (first direction W) between the proximal portion 42 and a head 43a of the bolt 43 and are also kept deformed by expansion in the direction R perpendicular to the screwed direction. The damper members 51 thus come into elastic contact both in the screwed direction W of the bolt 43 and the direction R perpendicular thereto for improvement in rigidity.

(4) The damper members 51 each have the tapered outer peripheral surface 51a in pressure contact with the tapered first/second restraining surface 71 of the first engine mounting portion 31, to prevent generation of shearing force at the outer peripheral surface 51 of the damper member 51 receiving force both in the first direction W and the second direction R.

(5) The pair of right and left damper members 51 is fitted to the inner periphery of each of the first engine mounting portions 31. The tapered outer peripheral surfaces 51a of the damper members 51 are decreased in diameter toward the center in the first direction W of the first engine mounting portion 31. The pair of damper members 51 and 51 is thus easily inserted to the first engine mounting portion 31 from the open ends in the first direction W of the first engine mounting portion 31 for facilitated assembling.

(6) The gap S in the first direction W is kept between the pair of damper members 51 and 51 disposed in each of the first engine mounting portions 31 to assure elastic expansion and contraction properties of the damper members 51 and 51 and achieve improved vibration absorption.

(7) In the structure of each of the first engine mounting portions 31 including the pair of opposite damper members 51 and 51 each having the tapered outer peripheral surface 51a, the major radial end 51d, and the minor radial end 51c, the collar 44 having the flange 44a and the washer 45 in abutment with the end edge opposite to the flange 44a of the collar 44 are fitted to the outer peripheral surface of the mounting bolt 43, the damper members 51 and 51 are fitted to the second restraining surface 62 of the collar 44, and the flange 44a and the washer 45 are in pressure contact with the major radial ends 51 at the end edges in the first direction W of the damper members 51. This configuration does not cause relative displacement of the collar 44 and the washer 45 to the proximal portion 42 by screwing the bolt 43 for assembling and prevents application of force (torsion) about the axis of the bolt to the damper members 51. The collar 44 and the washer 45 are provided separately from each other and the damper members 51 are inserted along the axis of the bolt 43, so as to dispose the damper members 51 around the collar 44 and simplify the configuration of the damper members.

(8) In comparison to a conventional damper made of baked rubber or the like, the damper members 51 are each in contact with the radially inner second restraining surface 62 and the radially outer first/second opposite surface 71. The damper members 51 at the first engine mounting portion 31 are thus increased in volume for improved inhibition of engine vibration transmitted from the engine E to the vehicle body frame 1. Furthermore, the damper members 51 effectively inhibit transmission of engine vibration in the first direction (vehicle width direction) W as well as in the second direction R perpendicular to the first direction W.

(9) The damper members 51 each have the major radial end 51d provided with the chamfered portion 51e. Even when the damper members 51 compressed in the first direction W expand in the second direction R, the major radial end 51e is prevented from largely expanding radially outward to keep the compact damper structure.

Second Embodiment

Figure 5:
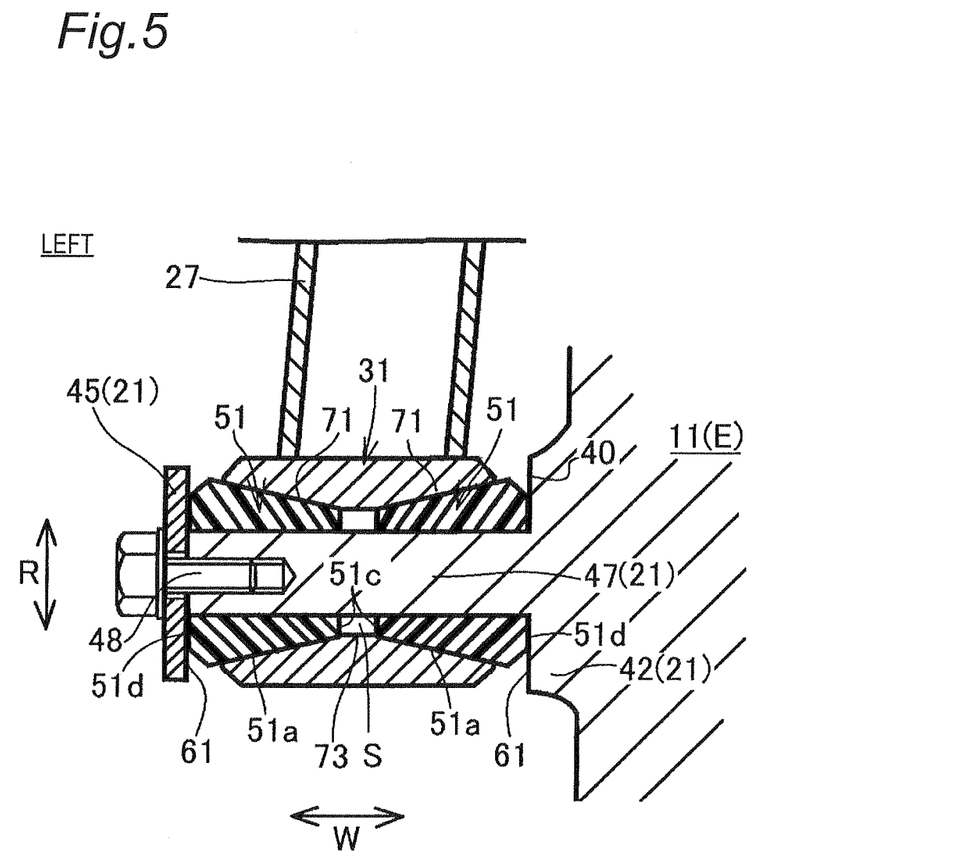
FIG. 5 is a sectional view according to a second embodiment of the present invention, similar to FIG. 4.

FIG. 5 depicts a structure according to the second embodiment of the present invention. The second embodiment is different in configuration from the first embodiment in that the female screw hole (41), the bolt (43), and the flanged collar (44) configuring the first mounted portion 21 according to the first embodiment are replaced with a columnar shaft 47 that projects horizontally outward in the first direction (vehicle width direction) W and is provided integrally with the proximal portion 42 adjacent to the cylinder block 11. The washer 45 is fixed at the outer end in the first direction W of the shaft 47 with a bolt 48. The remaining configurations are the same as those according to the first embodiment, and the same components and portions are denoted by the same reference signs.

The second embodiment functionally exerts functional effects similar to those of the first embodiment, while requiring neither collar nor large bolt for reduction in the number of components.

Third Embodiment

Figure 6:
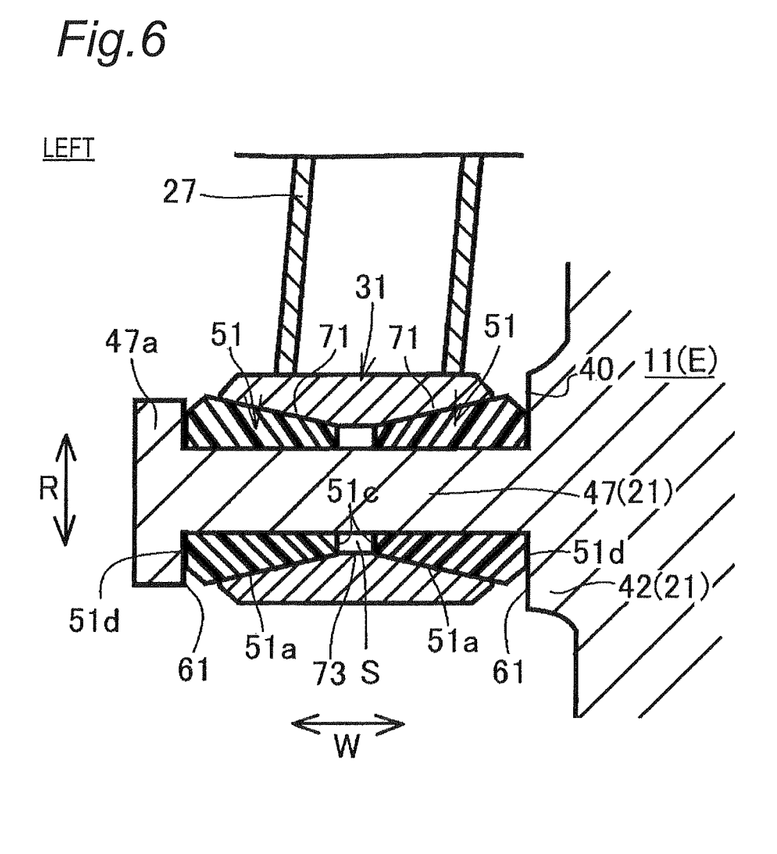
FIG. 6 is a sectional view according to a third embodiment of the present invention, similar to FIG. 4.

FIG. 6 depicts a structure according to the third embodiment of the present invention. The third embodiment is different in configuration from the first embodiment in that the female screw hole (41), the bolt (43), and the flanged collar (44) configuring the first mounted portion 21 according to the first embodiment are replaced with the columnar shaft 47 that projects horizontally outward in the first direction (vehicle width direction) W and is provided integrally with the proximal portion 42 adjacent to the cylinder block 11, as in the second embodiment. The third embodiment is further different in that the shaft 47 has an outer end in the first direction W integrally provided with a flange 47a in place of the washer and the bolt.

Figure 7:
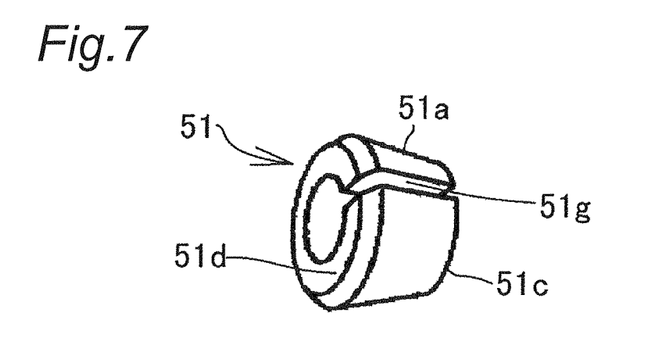
FIG. 7 is a perspective view of a damper member according to the third embodiment.

Provision of the flange 47a causes each of the damper members 51 to have an expanding slot 51g as depicted in FIG. 7. Specifically, the damper members 51 each expand due to the expanding slot 51g so as to be fitted to the shaft 47 from outward in the radial direction. The remaining configurations are the same as those according to the first embodiment, and the same components and portions are denoted by the same reference signs.

The third embodiment obviously achieves reduction in the number of components in comparison to the first embodiment, and does not need to include the washer or the bolt in comparison to the second embodiment.

Fourth Embodiment

Figure 8:
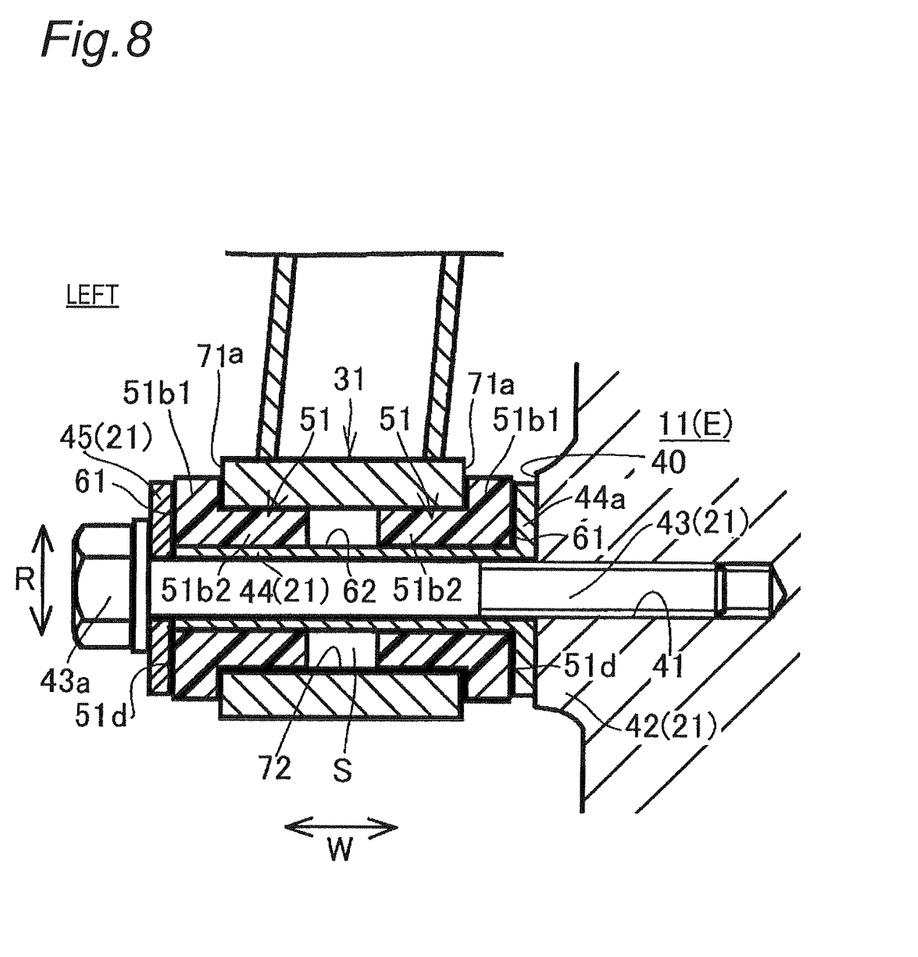
FIG. 8 is a sectional view according to a fourth embodiment of the present invention, similar to FIG. 4.

FIG. 8 depicts a structure according to the fourth embodiment of the present invention. The fourth embodiment is different in configuration from the first embodiment in that the outer peripheral surface of each of the damper members 51 is not tapered but has a stepped sectional shape including a major radial portion and a minor radial portion with an annular stepped surface provided therebetween, and the inner peripheral surface of the first engine mounting portion 31 has a straight tuboid shape with a uniform inner diameter throughout the entire length in the first direction (vehicle width direction) W. The remaining shapes are similar to those according to the first embodiment, and the same components and portions are denoted by the same reference signs.

The respective ends in the first direction W of the first engine mounting portion 31 have first opposite surfaces 71a and 71a facing the first restraining surfaces 61 of the washer 45 and the flange 44a with gaps in the first direction W. Furthermore, the inner peripheral surface of the first engine mounting portion 31 serves as a second opposite surface 72 facing the second restraining surface 62 on the outer periphery of the collar 44 with a gap in the second direction R. The damper members 51 each include the major radial portion that is compressed in the first direction W between the first restraining surface 61 and the first opposite surface 71a and serves as the first damper portion 51b1, and the minor radial portion that is compressed in the second direction R between the second restraining surface 62 of the collar 44 and the second opposite surface 72 of the first engine mounting portion 31 and serves as the second damper portion 51b2.

In comparison to the structure in which the outer peripheral surface of each of the damper members is tapered for fitting as in the first to third embodiments, the fourth embodiment provides the structure in which the damper members each have an uneven outer peripheral surface to engage with the first engine mounting portion 31. The first and second restraining surfaces 61 and 62 and the first and second opposite surfaces 71a and 72 in this structure effectively achieve improved absorption of vibration in the first direction W and the second direction R.

Fifth Embodiment

Figure 9:
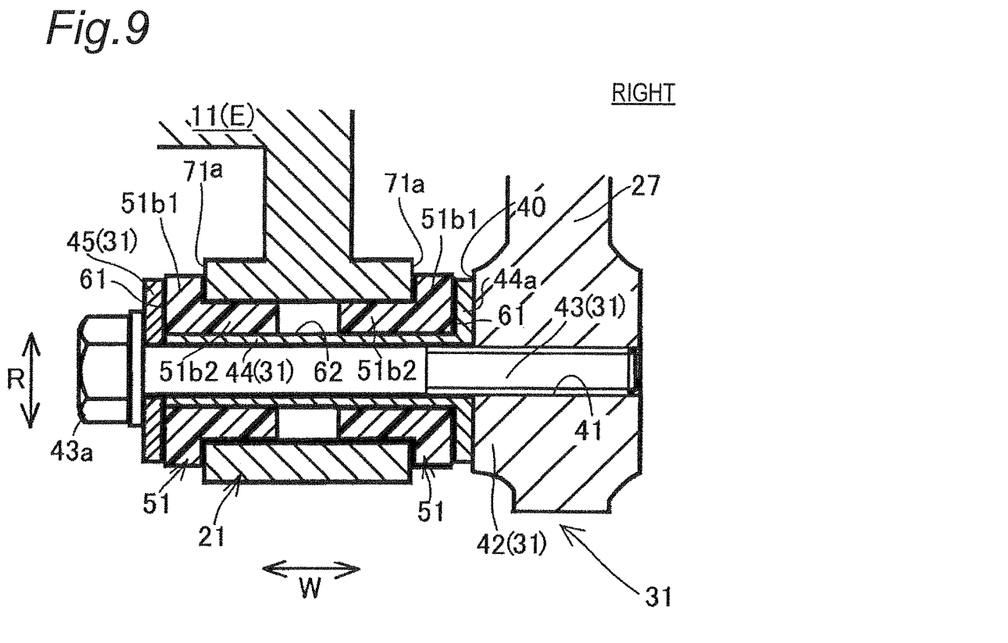
FIG. 9 is a sectional view of an engine mounting portion, a mounted portion, and damper members on the right according to a fifth embodiment of the present invention, similar to FIG. 4.

FIG. 9 depicts configurations of the first engine mounting portion 31 and the first mounted portion 21 on the right of the engine E according to the fifth embodiment of the present invention. The fifth embodiment is a modification example of the fourth embodiment, with a difference in configuration from the fourth embodiment depicted in FIG. 8 in that the first engine mounting portion 31 and the first mounted portion 21 have configurations exchanged with each other. Specifically, the cylinder block 11 of the engine E integrally includes a bracket 11a projecting forward, and the bracket 11a is provided with a tuboid first mounted portion 21. The engine mounting bracket 27 at the vehicle body frame is provided with a first engine mounting portion 31 including the proximal portion 42, the flanged collar 44, the washer 45, and the bolt 43. The fifth embodiment is thus similar to the fourth embodiment except that the first mounted portion 21 and the first engine mounting portion 31 have the configurations exchanged with each other. The same components are denoted by the same reference signs.

Sixth Embodiment

Figure 10:
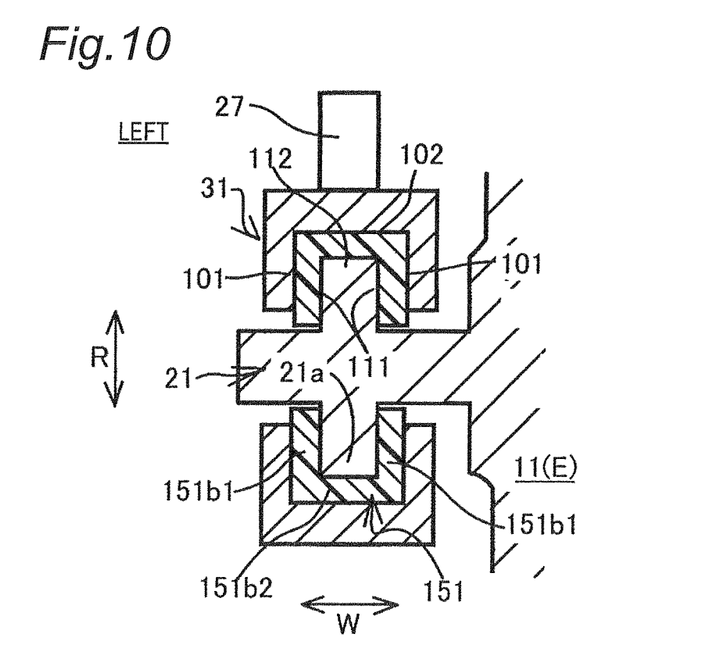
FIG. 10 is a sectional view according to a sixth embodiment of the present invention, similar to FIG. 4.

FIG. 10 depicts a structure according to the sixth embodiment of the present invention. The engine mounting bracket 27 at the vehicle body frame 1 is provided with an annular first engine mounting portion 31 having a cornered C sectional shape. The cylinder block 11 of the engine E has a side wall integrally provided with an first mounted portion 21 having a shaft shape projecting outward in the first direction (vehicle width direction) W. The first mounted portion 21 integrally includes an outward flange 21a that is inserted to a recess of the first engine mounting portion 31.

The first engine mounting portion 31 has inner surfaces including end surfaces that are opposite to each other in the first direction W and serve as first restraining surfaces 101. The flange 21a of the first mounted portion 21 has end surfaces in the first direction W serving as first opposite surfaces 111. The inner surfaces of the first engine mounting portion 31 include a tuboid inner peripheral surface serving as a second restraining surface 102. The flange 21a of the first mounted portion 21 has an outer peripheral end surface serving as a second opposite surface 112.

An annular rubber damper member 151 having a cornered C sectional shape is disposed between the first engine mounting portion 31 and the first mounted portion 21. The damper member 151 is fitted to the inner surfaces of the first engine mounting portion 31, and the flange 21a is fitted to the inner periphery of the damper member 151.

The damper member 151 includes first damper portions 151b1 that are provided at the respective ends in the first direction W and are sandwiched between the first restraining surfaces 101 of the first engine mounting portion 31 and the first opposite surfaces 111 of the flange 21a. The damper member 151 also includes a second damper portion 151b2 that is provided on a radially outer peripheral wall and is sandwiched between the second restraining surface 102 of the first engine mounting portion 31 and the second opposite surface 112 on the outer periphery of the flange 21a of the first mounted portion 21.

Other Embodiments (1) The respective embodiments described above assume that the first direction W agrees with the vehicle width direction. The present invention is not limited to such setting but can set the first direction in any appropriate vehicle direction.

The first to fifth embodiments provide the pair of damper members facing each other with the gap S therebetween in the first direction W. The pair of damper members can alternatively be disposed with no provision of the gap S.

(2) The damper members can have any appropriate shape without being limited to the truncated cone shape with the tapered outer peripheral surface, the stepped shape including the major radial portion and the minor radial portion connected by the annular stepped surface, or the cornered C sectional shape.

(3) The engine mounting portions according to each of the embodiments each have a ring shape, while these engine mounting portions can alternatively have a U shape.

(4) The collar and the washer provided in the first embodiment and the like can alternatively include two or three partial tuboid portions.

(5) The present invention is applicable to a vehicle equipped with an electric motor in place of the engine (internal combustion engine) E.

(6) FIG. 1 exemplifies application of the present invention to the structure in which the first mounted portion provided at the front end of the cylinder block is mounted to the first engine mounting portion. The present invention is also applicable to the second mounted portion 22 or the third or fourth mounted portion 23 or 24 at the rear end of the cylinder block 11 depending on a specification of a vehicle.

(7) The present invention is applicable to a motorcycle as well as to a saddle riding four-wheel traveling vehicle and the like.

DESCRIPTION OF REFERENCE SIGNS

1: Vehicle body frame
2: Main frame
5: Head tube
11: Cylinder block
21: First mounted portion
27: Engine mounting bracket
31: First engine mounting portion
40: Female screw hole
42: Proximal portion
43: Bolt
44: Flanged collar
44a: Flange
45: Washer
51: Damper member
51a: Tapered outer peripheral surface
51b1, 51b2: First and second damper portions
61, 62: First and second restraining surfaces
71: First/second opposite surface
71a, 72: First and second opposite surfaces
151: Damper member
151b1, 151b2: First and second damper portions
101, 102: First and second restraining surfaces
111, 112: First and second opposite surfaces

The invention claimed is:

1. An engine support structure for a saddled vehicle, the structure comprising:

a pair of mounted portions provided integrally with an engine and disposed at lateral ends in a vehicle width direction of the engine;

a pair of engine supporting brackets disposed at lateral ends in the vehicle width direction of a vehicle body frame and extending to the mounted portions, respectively; and engine mounting portions provided at the brackets, respectively;

wherein each of the mounted portions is mounted to a corresponding one of the engine mounting portions with a damper member provided therebetween to be independently elastically displaceable, wherein a first one of the engine mounting portions and the corresponding one of the mounted portions has a first restraining surface restraining a shift of a second one of the engine mounting portions in a predetermined first direction, and a second restraining surface restraining a shift of the second one of the engine mounting portions in a second direction perpendicular to the first direction, wherein the second one of the engine mounting portions and the corresponding one of the mounted portions has a first opposite surface facing the first restraining surface with a gap therebetween in the first direction, and has a second opposite surface facing the second restraining surface with a gap therebetween in the second direction, and wherein the damper member has a first damper portion sandwiched between the first restraining surface and the first opposite surface so as to be elastically deformable in the first direction, and has a second damper portion sandwiched between the second restraining surface and the second opposite surface to be elastically deformable in the second direction.

2. The engine support structure for the saddled vehicle according to claim 1, wherein the mounted portions are provided integrally at a front portion of the engine.

3. A saddled vehicle comprising the engine support structure according to claim 1, wherein the saddled vehicle is a motorcycle.

4. An engine support structure for a saddled vehicle, the structure comprising:
a pair of mounted portions provided integrally with an engine and disposed at lateral ends in a vehicle width direction of the engine;
a pair of engine supporting brackets disposed at lateral ends in the vehicle width direction of a vehicle body frame and extending to the mounted portions, respectively; and
engine mounting portions provided at the brackets, respectively;
wherein each of the mounted portions is mounted to a corresponding one of the engine mounting portions with a damper member provided therebetween to be independently elastically displaceable,
wherein a first one of the engine mounting portions and the corresponding one of the mounted portions has a proximal portion and a bolt member screwed to the proximal portion in a screwed direction,
wherein the damper member is disposed between a head of the bolt member and the proximal portion, and has an uneven portion fitted to a second one of the engine mounting portions and the corresponding one of the mounted portions in a direction perpendicular to the screwed direction, and
wherein, in a state where each of the mounted portions is mounted to a corresponding one of the engine mounting portions with the damper member disposed therebetween, the damper member is deformed by compression in the screwed direction between the proximal portion and the head of the bolt member, and is kept deformed by expansion in the direction perpendicular to the screwed direction, wherein the damper member has a tapered outer peripheral surface not provided with the uneven portion, and the second one of the engine mounting portions and the corresponding one of the mounted portions fitted to the tapered outer peripheral surface of the damper member has an inner peripheral surface tapered correspondingly to the tapered outer peripheral surface of the damper member, wherein the screwed direction is in the vehicle width direction, wherein the damper member has a tuboid shape with a minor radial end and a major radial end, and comprises a pair of damper member sections, wherein the minor radial ends of the damper member sections fastened by the bolt member face each other with a constant gap therebetween in the vehicle width direction, wherein the bolt member includes a shaft having an outer peripheral surface fitted to a collar having a flange and a washer in abutment with an end edge opposite to the flange of the collar, wherein the damper member sections are fitted to an outer peripheral surface of the collar, and the flange and the washer are in contact with the end edges in the vehicle width direction of the damper members, wherein the damper member sections and the collar are separate from each other, wherein the pair of damper member sections is axially longer than the collar, wherein the outer peripheral surfaces of the damper member sections are tapered to be gradually decreased in diameter from the major radial ends to the minor radial ends, and wherein the major radial ends of the damper member sections each have a chamfered portion.

5. The engine support structure for the saddled vehicle according to claim 4, wherein the mounted portions are provided integrally at a front portion of the engine.

6. A saddled vehicle comprising the engine support structure according to claim 4, wherein the saddled vehicle is a motorcycle.

* * * * *